United States Patent
Kokuzawa et al.

(10) Patent No.: US 6,284,823 B1
(45) Date of Patent: Sep. 4, 2001

(54) ANTISTATIC ACRYLIC RESIN COMPOSITION

(75) Inventors: Yukio Kokuzawa; Kazunobu Sato, both of Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/111,761

(22) Filed: Jul. 8, 1998

(30) Foreign Application Priority Data

Jul. 11, 1997 (JP) .................................................. 9-186881

(51) Int. Cl.⁷ .................................. C08K 3/32; C08K 3/30
(52) U.S. Cl. .................... 524/154; 260/DIG. 16; 524/161
(58) Field of Search ...................... 524/154, 161, 524/166, 224, 230

(56) References Cited

U.S. PATENT DOCUMENTS

| 3,835,148 | * | 9/1974 | Oxe . |
| 4,604,416 | * | 8/1986 | Nakai ...................................... 524/145 |
| 4,943,380 | * | 7/1990 | Sugiura . |

OTHER PUBLICATIONS

European Patent 0 023 650 Feb. 11, 1981.*

* cited by examiner

*Primary Examiner*—Christopher Henderson
(74) *Attorney, Agent, or Firm*—Fitch, Even, Tabin & Flannery

(57) ABSTRACT

Acrylic resin compositions having excellent antistaticity, good appearance and superior optical properties made by blending (A) 100 parts by weight of an acrylic resin; (B) a phosphonium sulfonate consisted of organic sulfonate anion and organic phosphonium cation; (C) a lithium benzene-sulfonate; and (D) 0.05 to 2.0 parts by weight of a fatty acid ester and/or amide, wherein (B)/(C) is 2/8 to 8/2 by weight and (B) plus (C) is 0.2 to 2.5 parts by weight.

7 Claims, No Drawings

1

ANTISTATIC ACRYLIC RESIN COMPOSITION

BACKGROUND OF THE INVENTION

1. Field of the Invention

The present invention relates to acrylic resin compositions which have excellent antistatic property and good appearance, with small decrease of an antistatic property particularly when using a masking film. The present invention is to provide suitable materials for electric and electronic appliances, covers for lighting apparatus, and lens for projection TVs, to which dust may often be adhered.

2. Description of Related Arts

Acrylic resins have been widely utilized in many fields such as electric appliances and household use articles in the form of sheets, molded products, etc., due to favorable characteristics such as lightness in the weight and easy handlings. Although the resins are excellent in electric insulation performance, they have some disadvantages in the charge and accumulation of static electricity. For instance, dust is easily adhered on the surface of the apparatus until the transparency and luster are degraded, the fine appearance is damaged and the commercial values are decreased. In order to cope with such problems, one of approaches is that, to acrylic resins, is added a metal salt of alkylsulfonic acid represented by the formula R—SO$_3$M, wherein R is an alkyl group and M is a salt-forming metal such as alkali and alkaline earth metals. However, addition of antistatic agents encounters problems such as decrease in transparency, deterioration in appearance, etc. JP 7-18137A and 7-207088A suggest to blend a specific resin with a particular metal sulfonate salt, in order to dissolve the problems.

Furthermore, the surfaces of thermoplastic resin products are generally masked with, for example, a polyethylene film, in order to protect appearance thereof. Acrylic resin compositions prepared according to the methods mentioned above are, however, not free from disadvantages in remarkable decrease of antistaticity, after a long time contact with the masking film. This would be probably due to migration of the antistatic agent applied on the surface of the compositions to a paste of the masking film. If the paste for masking film is replaced by that which the antistatic agent hardly migrates to, peeling-off of the masking film tends to occur, causing difficulties in maintenance and storage.

SUMMARY OF THE INVENTION

After the present inventors have made extensive studies to overcome the drawbacks in the conventional methods, they succeed in producing acrylic resin compositions which can be preserved and stored for a long period of time with an excellent adhesiveness to resin materials for masking, by blending an acrylic resin with specific phosphonium sulfonate and lithium sulfonate, each in specific amounts and with specific amount ratio, as well as fatty acid ester and/or fatty acid amide. Namely, the present invention is an acrylic resin composition which comprises (A) 100 parts by weight of an acrylic resin; (B) a phosphonium sulfonate represented by the formula I:

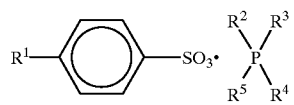

wherein $R^1$ is a straight-chain or branched long-chain alkyl or alkenyl group having 8 to 22 carbon atoms and $R^2$ through $R^5$ are, respectively, a hydrogen atom or alkyl or aryl group having 1 to 10 carbon atoms, which may be the same or different; (C) a lithium sulfonate of the formula II:

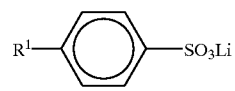

wherein $R^1$ has the same meaning as above, the weight ratio of (B)/(C) being within the range from 2/8 to 8/2 and the total amount of (B) and (C) being 0.2 to 2.5 parts by weight; and (D) 0.05 to 2.0 parts by weight of a fatty acid ester and/or fatty acid amide.

DESCRIPTION OF THE PREFERRED EMBODIMENTS

The present invention will be further described hereunder. The acrylic resins (A) of this invention include homopolymers or copolymers of acrylic acid, acrylic acid esters, methacrylic acid and methacrylic acid esters. The acrylic resins (A) employed in the invention are those having not less than 50% by weight of methyl methacrylate monomer unit. Preferably, they are methyl methacrylate-styrene copolymer resins having methyl methacrylate unit to styrene unit of from 80:20 to 50:50 by weight. More preferably, from the view points of kneaded extrusion and the physical properties, those having 100,000 to 200,000 of weight average molecular weight, being readily extrusion-moldable at a temperature of 250° C. or less, and having 1.50 to 1.54 of an index of refraction are suitable for various optical instruments. If the temperature at the extrusion exceeds 250° C., the antistatic agent isolated causes whiting and the like to damage appearance.

The acrylic resins (A) are produced according to any of known polymerization methods, such as bulk polymerization, suspension polymerization, emulsion polymerization, solution polymerization, melt polymerization, and the like. Forms of the resins may be of pellets, beads, powdered or pulverized amorphous matters, or molten state, so far as they can be dealt with extruders.

The phosphonium sulfonates (B) are represented by the formula I:

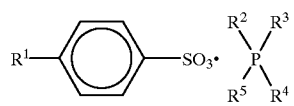

wherein $R^1$ is a straight chain or branched long-chain alkyl or alkenyl group having 8 to 22 carbon atoms, and $R^2$ through $R^5$ are, respectively, a hydrogen atom or alkyl or aryl group having 1 to 10 carbon atoms, which may be the same or different.

The phosphonium sulfonates (B) are composed of organic sulfonate anions and organic phosphonium cations. As such organic sulfonate anions, there are mentioned octylbenzenesulfonate, decylbenzenesulfonate, dodecylbenzenesulfonate, tetradecylbenzenesulfonate, hexadecylbenzenesulfonate, octadecylbenzenesulfonate, and the like, which may be used singly or as a mixture.

As the organic phosphonium cations, there are mentioned tetramethylphosphonium, tetraethylphosphonium, tetrabutylphosphonium, triethylmethylphosphonium, tributylmethylphosphonium, trioctylmethylphosphonium, trimethylbutylphosphonium, trimethyloctylphosphonium, trimethyllaurylphosphonium, trimethylstearylphosphonium, triethyloctylphosphonium, tributyloctylphoshonium and the like aliphatic phosphonium cations; triphenylmethylphosphonium, triphenylethylphosphonium and the like aromatic phosphonium cations; and triphenylbenzylphosphonium, tributylbenzylphosphonium and the like alkylarylphosphonium cations. Further, tetramethylolphosphonium, tri(2-cyanoethyl)methylphosphonium, tri(2-cyanoethyl) ethylphosphonium, tri(2-cyanoethyl)benzylphosphonium, tri(3-hydroxypropyl)benzylphosphonium, trimethyl-(2-hydroxyethyl) phosphonium, tributyl(2-hydroxyethyl) phosphonium and the like substituted aliphatic phosphonium cations may also be used.

Among these phosphonium sulfonates, tetrabutylphosphonium dodecylbenzenesulfonate and tetrabutylphosphonium 1,6,8-trimethylnonylbenzene sulfonate are preferable. Thus the phosphonium sulfonates according to the present invention may be composed of such organic sulfonate anions and such organic phosphonium cations, as exemplified, in arbitrary combinations, but they should not be limited thereto.

The lithium sulfonates (C) are represented by the formula II:

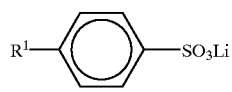

II wherein $R^1$ has the same meaning as above. As the specific examples of the lithium sulfonates, there are mentioned, for example, lithium octylbenzenesulfonate, lithium dodecylbenzenesulfonate, lithium triisopropylnaphthalenesulfonate, lithium dibutylnaphthalenesulfonate and the like, but they should not be limited thereto. Among those lithium compounds of the formula II as illustrated above, lithium dodecylbenzenesulfonate is preferable.

The lithium sulfonates (C) are highly hygroscopic. Those in solution form are preferable, because those in the solid state are so readily coagulated and sticky, that they are too difficult to handle. The solution can be prepared by mixing the lithium sulfonate (C) with a solvent under stirring at room temperature. Any of solvents may be used so far as it has diffusibility and dissolves the lithium sulfonates (C). Water, methanol, ethanol, isopropanol and other lower alcohols, as well as mixtures thereof, may be used. Preference is mixtures of water with methanol or isopropanol, because they give large solubility and are easily handled. A concentration of the lithium sulfonates in the solution may be 60% to 90% by weight, preferably 70% to 80% by weight. When the concentration is smaller than 60% by weight, enough solvent is hardly eliminated in extruders, thus forms of the resin produced are deteriorated. In addition, various difficulties are encountered such as small extrusion stability due to inferior slipping at a feeder of extruders, and/or failure to have a desired amount of the sulfonates contained in the resin compositions. On the other hand, when the concentration is larger than 90% by weight, the sulfonates (C) are too thick to effect uniform mixing with the acrylic resins, thus no good dispersion in the extruders is expected. Furthermore, coagulation often encountered makes it difficult to extrude.

Addition of fatty acid esters and/or fatty acid amides (D) to the resin compositions composed of the acrylic resins (A), phosphonium sulfonates (B) and lithium sulfonates (C) improves antistatic property through synergism as well as good dispersion of the antistatic agents.

The fatty acid esters include glycerol esters of aliphatic monocarboxylic acids having 8 to 22 carbon atoms and containing or not additionally one or more hydroxyl groups. For example, glycerol mono-, di- or tri-palmitates and glycerol mono-, di- or tri-laurates may be mentioned. In addition, hydrogenated castor oil may be used. Preference are glycerol monostearate and hydrogenated caster oil.

The fatty acid amides include amides and bisamides of higher fatty acids, specifically, ethylene-bis-stearoamide, oleic acid amide, stearic acid amide, N,N'-methylene-bis-stearoamide and methylolstearoamide. Preference is ethylene-bis-stearoamide.

These fatty acid esters or fatty acid amides may be used singly or as a mixture.

Weight ratio of the phosphonium sulfonates (B) to the lithium sulfonates (C), i.e., (B)/(C), is within the range from 2/8 to 8/2, preferably from 3/7 to 7/3. When the ratio is outside the above range, the antistatic property of the product deteriorates unfavorably as the lapse of time.

A total amount of the phosphonium sulfonates (B) and lithium sulfonates (C) is 0.2 to 2.5 parts by weight, preferably 0.5 to 2.0 parts by weight, on the basis of 100 parts by weight of the acrylic resins (A). When the total amount is smaller than 0.2 part by weight, desired antistatic effect can not be attained. On the other hand, the total amount is larger than 2.5 parts by weight, blending of the sulfonates with the acrylic resins tends to be difficult until the appearance of the shaped articles made from the present composition is unfavorably poor due to whiting or the like.

An amount of the fatty acid esters and/or fatty acid amides (D) is 0.05 to 2.0 parts by weight, on the basis of 100 parts by weight of the acrylic resins (A).

The acrylic resins (A) added may further contain other various additives, if required, such as stabilizers, lubricants, fire retardants, releasing agents, dyes and pigments, fillers, light diffusers such as fine particles of inorganic compounds, for example, glass and barium sulfate, styrene or acrylic cross-linking organic polymers in the form of fine particles, and/or rubber impact absorbers.

The resin compositions according to the present invention may be produced by any of the conventional kneading methods. For example, acrylic resins (A), phosphonium sulfonates (B), lithium sulfonates (C) in a liquid form, and fatty acid esters and/or amides (D), are blended by mixing in a mixer such as tumbler, supermixer, etc., and then the mixture obtained is melt-kneaded in a extruder having a de-gasing device. Alternatively, a master batch prepared by kneading of the above sulfonates (B), (C) and fatty acid derivatives (D) into the acrylic resins (A) in high concentrations, is diluted with the acrylic resins (A).

The acrylic resin compositions according to the invention can be shaped, for example, into sheets by an extruder, molded products by an injection molder, or films by a T-die, inflation, calendar, or other methods.

The acrylic resin compositions of the invention have an excellent antistatic property which is durable for a longer period of time, as well as good appearance and optical characteristics. The compositions are suitably utilized for manufacturing electric and electronic appliances, covers for lighting apparatus, lens for projection TVs, etc.

The present invention will more fully be explained with reference to the following non-limiting examples.

Evaluations are made according to the procedures as follows:

(1) Extrudability: A resin composition is melt-kneaded and extruded by means of a 45 mm Ø double-axis vent-type extruder, and the state of extruded product is evaluated. A symbol G shows good extrusion, and symbol N shows troublesome extrusion due to, for example, coagulation of resin at a hopper.

(2) Appearance: The appearance of product is visually evaluated by comparing with a blank sheet or a sheet composed merely of a thermoplastic resin. A symbol G shows transparent with no cloudiness, sink and rib, and a symbol N shows existence of cloudiness, sink marks, ribs, etc.

(3) Adhesiveness of masking film: After a masking film is applied onto a shaped product, the state is visually evaluated. A symbol G shows excellent adhesiveness of the masking film with no peeling, and a symbol N shows no good state due to, for example, peeling-off of the masking film.

(4) Total light transmittance and cloudiness: These are measured by using a color difference and turbidity meter made by NIPPON DENSHOKU Industry Co. Ltd. (model: COH-300A), according to JIS-K7105.

(5) Yellow index (YI value): The index is measured by using a color difference and trubidity meter made by NIPPON DENSHOKU Industry Co. Ltd. (model: COH-300A), according to JIS-K7105.

(6) Surface specific resistance: A product just after molded is left in a thermostatic chamber at a temperature of 23° C. under a humidity of 50% for 24 hours, and the surface specific resistance of the product is measured by using a digital superhigh resistance/microammeter made by ADVANTEST K. K. (model: R-12704), according to JIS-K6911.

(7) Surface specific resistance after peeling-off: Onto a sheet just formed by sheet extrusion is adhered a masking film ("FM-5000" made by DAIO KAKO K. K.), and then the product is left to stand in a drier at a temperature of 43° C. for 8 weeks. Then the masking film is peeled off, and the surface specific resistance is measured in the same manner as mentioned in (6).

EXAMPLE 1

To one hundred parts by weight of pellets of a methyl methacrylate-styrene copolymer resin (A) having 150,000 of a weight average molecular weight, obtained by copolymerization of a monomer mixture consisting of 64% by weight of methyl methacrylate and 36% by weight of styrene, are added 0.6 part by weight of tetrabutylphosphonium 1,6,8-trimethylnonylbenzenesulfonate (B), 0.2 part by weight of lithium dodecylbenzenesulfonate (C) in a liquid form, i.e., a solution containing of 80% by weight of the lithium dodecylbenzenesulfonate, 15% by weight of isopropanol and 5% by weight of water, wherein weight ratio of (B)/(C) is 8/2, and 0.1 part by weight of ethylene-bis-stearoamide (D). A mixture after having been well blended in a super-mixer of 1500 rpm for 3 minutes is melt-kneaded by using a 45 mm Ø double-axis, vent-type extruder at a resin temperature of 230° C. to produce pellets. Test specimens prepared using a 65 mm Ø vent-type sheet extruder are measured in respect to various physical properties. The results are shown in Table 1.

EXAMPLES 2 AND 3

Similarly as in Example 1, to 100 parts by weight of methyl methacrylate-styrene copolymer resin (A) are blended tetrabutylphosphonium 1,6,8-trimethylnonylbenzenesulfonate (B), lithium dodecylbenzenesulfonate (C) in a liquid form, and ethylene-bis-stearoamide (D), each of (A)–(D) being the same as that used in Example 1. Amounts of (B)–(D) are shown in Table 1. The results are also shown in Table 1.

COMPARATIVE EXAMPLES 1 THROUGH 4

To 100 parts by weight of methyl methacrylate-styrene copolymer resin (A) are blended terabutylphosphonium 1,6,8-trimethylnonyl-benzenesulfonate (B), lithium dodecylbenzenesulfonate (C) in a liquid form and ethylene-bis-stearoamide (D), each of (A)–(D) being the same as that used in Example 1. Amounts of (B)–(D) are shown in Table 2. The same procedure as in Example 1 is repeated. The results are shown in Table 2.

COMPARATIVE EXAMPLE 5

To 100 parts by weight of methyl methacrylate-styrene copolymer resin (A) is blended 5.0 parts by weight of tetrabutylphosphonium 1,6,8-trimethylnonylbenzenesulfonate (B), each of (A) and (B) being the same as that used in Example 1. The same procedure as in Example 1 is repeated. The results are shown in Table 3.

COMPARATIVE EXAMPLE 6

Test specimens are prepared from only the methyl methacrylate-styrene copolymer resin (A) used in Example 1. Various physical values are measured. The results are shown in Table 3.

TABLE 1

|  | Examples | | |
|---|---|---|---|
|  | 1 | 2 | 3 |
| Blended Composition (parts by weight) | | | |
| (A) | 100 | 100 | 100 |
| (B) | 0.6 | 0.4 | 0.2 |
| (C) | 0.2 | 0.5 | 0.8 |
| (D) | 0.1 | 0.1 | 0.1 |
| (B)/(C) | 8/2 | 5/5 | 2/8 |
| Thickness (mm) | 1.9 | 1.9 | 1.9 |
| Extrudability | G | G | G |
| Appearance | G | G | G |
| Adhesiveness of masking film | G | G | G |
| Total light transmittance (%) | 92.0 | 92.0 | 92.1 |
| Cloudiness (%) | 0.2 | 0.2 | 0.2 |
| Yellow index (YI) | 0.9 | 0.8 | 0.7 |
| Surface specific resistance (Ω) | $4 \times 10^{12}$ | $4 \times 10^{12}$ | $3 \times 10^{12}$ |
| The same after peeling-off (Ω) | $5 \times 10^{13}$ | $4 \times 10^{13}$ | $7 \times 10^{13}$ |

(A) Methyl methacrylate-styrene copolymer resin
(B) Tetrabutylphosphonium 1,6,8-trimethylnonyl benzenesulfonate
(C) Lithium dodecylbenzenesulfonate in a liquid form (80% by weight)
(D) Ethylene-bis-stearoamide

TABLE 2

| | Comparative Examples | | | |
|---|---|---|---|---|
| | 1 | 2 | 3 | 4 |
| Blended Composition (parts by weight) | | | | |
| (A) | 100 | 100 | 100 | 100 |
| (B) | 0.8 | 0.7 | 0.1 | 0 |
| (C) | 0 | 0.1 | 1.1 | 1.0 |
| (D) | 0.1 | 0.1 | 0.1 | 0.1 |
| (B)/(C) | 10/0 | 9/1 | 1/9 | 0/10 |
| Thickness (mm) | 1.9 | 1.9 | 1.9 | 1.9 |
| Extrudability | G | G | G | G |
| Appearance | G | G | G | G |
| Adhesiveness of masking film | G | G | G | G |
| Total light transmittance (%) | 91.8 | 92.0 | 92.2 | 92.1 |
| Cloudiness (%) | 0.3 | 0.2 | 0.2 | 0.2 |
| Yellow index (YI) | 0.8 | 0.8 | 0.7 | 0.7 |
| Surface specific resistance (Ω) | $5 \times 10^{13}$ | $7 \times 10^{12}$ | $3 \times 10^{12}$ | $1 \times 10^{13}$ |
| The same after peeling-off (Ω) | $1 \times 10^{15}$ | $2 \times 10^{15}$ | $4 \times 10^{14}$ | $3 \times 10^{15}$ |

(A), (B), (C) and (D) are the same as in Table 1.

TABLE 3

| | Comparative Examples | |
|---|---|---|
| | 5 | 6 |
| Blended Composition (parts by weight) | | |
| (A) | 100 | 100 |
| (B) | 5.0 | — |
| (C) | — | — |
| (D) | — | — |
| Thickness (mm) | 1.9 | 1.9 |
| Extrudability | N | G |
| Appearance | N | G |
| Adhesiveness of masking film | N | G |
| Total light transmittance (%) | — | 92.2 |
| Cloudiness (%) | — | 0.1 |
| Yellow index (YI) | — | 0.5 |
| Surface specific resistance (Ω) | — | $3 \times 10^{16}$ |
| The same after peeling-off (Ω) | — | $3 \times 10^{16}$ |

(A), (B), (C) and (D) are the same as in Table 1.

What is claimed is:

1. An acrylic resin composition which comprises:

(A) 100 past by weight of an acrylic resin;

(B) a phosphonium sulfonate which comprises at least one of tetrabutylphosphonium dodecylbenzenesulfonate or tetrabutylphosphonium 1,6,8-trimethylnonylbenzenesulfonate;

(C) a lithium sulfonate represented by the formula (II):

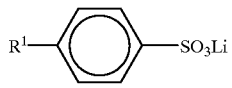

wherein $R^1$ represents a straight-chain or branched long-chain alkyl or alkenyl group having 8 to 22 carbon atoms, the weight ratio of (B)/(C) is within the range from 2/8 to 8/2, and the total amount of (B) and (C) is 0.2 to 2.5 parts by weight; and (D) 0.05 to 2.0 parts by weight of at least one compound selected from among fatty acid esters and fatty acid amides, said fatty acid esters comprising stearic acid monoglyceride or hardened caster oil and said fatty acid amides comprising ethylene-bis-stearoamide.

2. The acrylic resin composition according to claim 1, wherein the acrylic resin (A) is a methyl methacrylate-styrene copolymer resin having methyl methacrylate unit to styrene unit of from 80:20 to 50:50, by weight.

3. The acrylic resin composition according to claim 2, wherein the acrylic resin (A) has 100,000–200,000 of weight average molecular weight, is extrudable at a temperature of 250° C. or less and has 1.50–1.54 of index of refraction.

4. The acrylic resin composition according to claim 1, wherein the ratio of (B)/(C) is from 3/7 to 7/3.

5. The acrylic resin composition according to claim 1, wherein the total amount of (B) plus (C) is 0.5–2.0 parts by weight on the basis of 100 parts by weight of (A).

6. The acrylic resin composition according to claim 1, wherein the lithium sulfonate (C) comprises lithium dodecylbenzenesulfonate.

7. An acrylic resin composition which comprises:

(A) 100 parts by weight of a methyl methacrylate-styrene copolymer resin having from 80:20 to 50:50, by weight, of methyl methacrylate units relative to styrene units;

(B) a phosphonium sulfonate selected from the group consisting of tetrabutylphosphonium dodecylbenzenesulfonate and tetrabutylphosphonium 1,6,8-trimethylnonylbenzenesulfonate;

(C) at least one lithium sulfonate, said lithium sulfonate comprising lithium dodecylbenzenesulfonate, wherein the ratio of (B)/(C) is within a range of from 2/8 to 8/2, and wherein the total amount of (B) and (C) is 0.2 to 2.5 parts by weight; and (D) 0.05 to 2.0 parts by weight of ethylene-bis-stearoamide.

* * * * *